March 26, 1963 E. CHIARELLO 3,082,645
AUTOMATIC TRANSMISSION HOUSING
Filed March 24, 1961
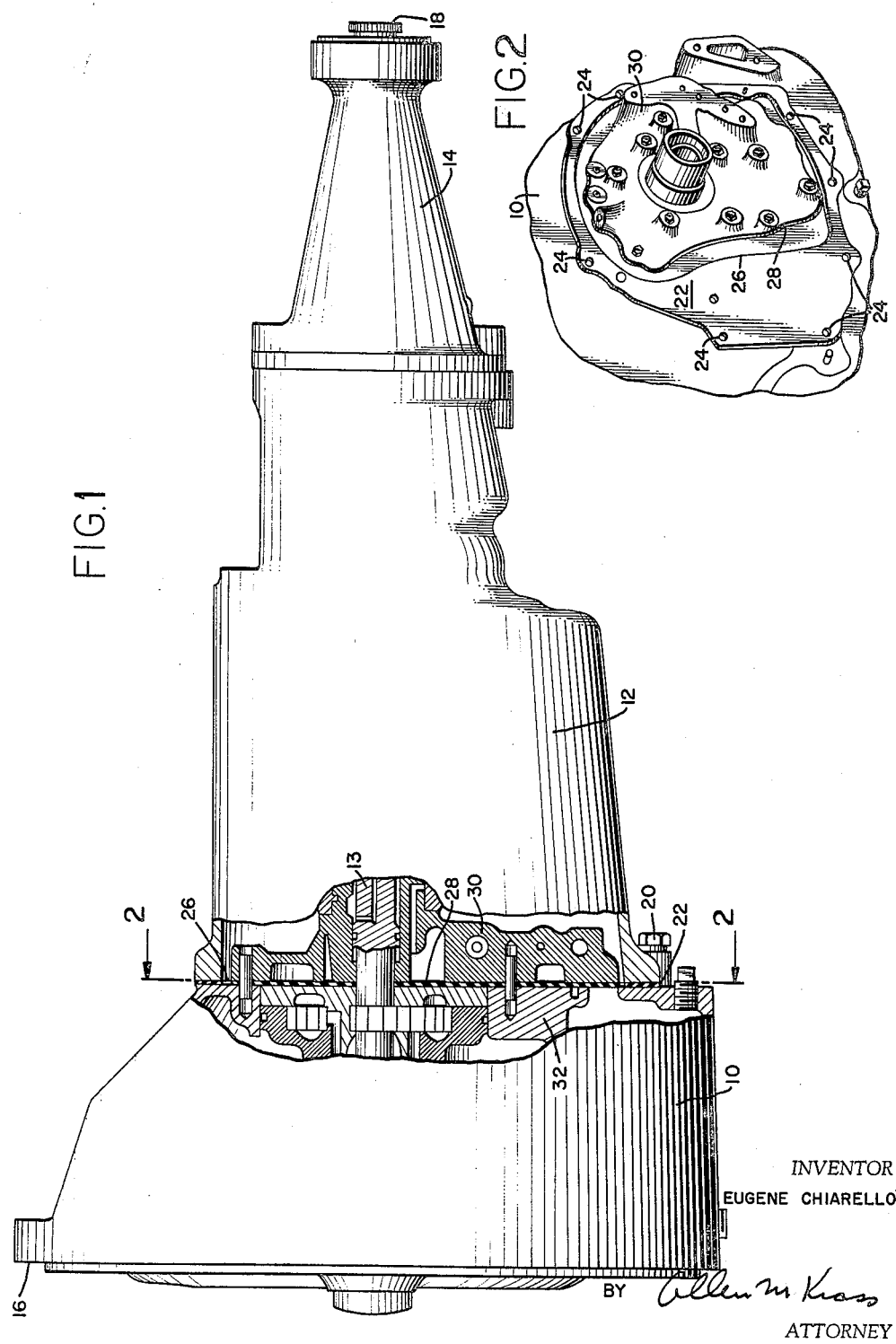
INVENTOR
EUGENE CHIARELLO
BY *Allen M Krass*
ATTORNEY

United States Patent Office 3,082,645
Patented Mar. 26, 1963

3,082,645
AUTOMATIC TRANSMISSION HOUSING
Eugene Chiarello, 146—30 227th St., Springfield Gardens, Queens, N.Y.
Filed Mar. 24, 1961, Ser. No. 98,236
2 Claims. (Cl. 74—606)

This invention relates to automatic transmissions for motor vehicles and, more particularly, to an improvement in a housing for a specific automatic transmission. For the past 10 years, the General Motors Corporation of Detroit, Michigan, has incorporated in many of its automotive vehicles an automatic transmission know as "Power Glide." The specific nature of this transmission is described in the "1955 Chevrolet Passenger Car Shop Manual," copyright 1954, by General Motors Corporation, on pages 7–35 to 7–98.

As is disclosed in the above manual, the forward end of the transmission connects to the flywheel housing of the vehicle's engine and the output shaft of the engine, which is centrally located within this flywheel housing, connects to the input shaft of the transmission. At its rear end, the output shaft of the transmission connects to the vehicle's drive shaft. The transmission comprises two broad assemblies. A forward assembly which is retained in what is termed the transmission housing, and the rear assembly which is retained in what is termed a transmission case. In the Power Glide transmission as described, these two units are joined by surfaces which are connected by seven bolts which are accessible from the outside of the transmission and a single bolt which is only accessible from the interior of the transmission housing. Therefore, in order to gain access to parts within the transmission case such as the brake bands, which frequently cause difficulty, it is necessary to remove the entire transmission from the vehicle. This is an expensive and time-consuming process. But for a single internally accessible bolt, it would be possible to gain access to the transmission case by removing the outer seven bolts so as to separate the case from the housing without removing the housing from its connection with the vehicle.

An important reason for the provision of the internally accessible bolt is to solidly retain the gasket which separates the housing from the case. This is a single gasket which is disposed between the transmission valve body and the transmission stator support as well as between the case and the housing. When the case is removed from the housing, this gasket is normally damaged so that it must be replaced. Since the same gasket separates the valve body from the stator support, these units must be separated in order to replace the gasket. This is also a time-consuming operation because of the multiplicity of connectors which join the two units.

The present invention contemplates a Power Glide transmission in which two separate gaskets are used to separate the transmission housing from the transmission case and the valve body from the stator support. While these gaskets are in the same plane and contact one another at at least one edge point, they are separable so that one may be replaced without necessitating the other's replacement. It has been determined that when these gaskets are made separable, the forces on the gasket which require the support on the inner bolt are eliminated so that this bolt is no longer necessary to a proper joinder between the transmission housing and case. Accordingly, the present invention provides a structure in which the transmission case may be separated from the housing while the housing remains connected to the flywheel housing of the engine and thereby repairs may be made to the brake bands, clutch plates, gears, and other parts within the transmission case without undergoing the necessity of removing the entire transmission from the vehicle. When the present invention is used, only the gasket between the transmission hosuing and case need be replaced in order to reconnect the units. The gasket between the valve body and the stator support remains untouched.

It is therefore an object of the present invention to provide a transmission of the Power Glide type wherein separate gaskets are disposed between the transmission housing and transmission case and the valve body and stator support and in which the bolt connectors between the transmission housing and transmission case are all accessible from the exterior of the unit.

Other objects, advantages, and applications of the present invention will be made apparent by the following detailed description of a preferred embodiment of the invention. The description makes reference to the accompanying drawings in which:

FIGURE 1 is a side view, partially broken away, of a Power Glide transmission employing the present invention; and FIGURE 2 is a perspective view of the forward transmission housing end of the transmission separated from the portion embodied in the transmission case with the valve body in place.

The terms herein used to describe the various transmission components will be largely those employed in the previously referred to Shop Manual.

A transmission of the Power Glide type is generally disposed in three sections: a front section affixed within a transmission housing 10, a middle section affixed within a transmission case 12, and a rear section affixed within the transmission extension 14.

The transmission housing 10 is normally affixed within a vehicle with its forward edge 16 abutting and bolted to the flywheel housing of the engine through means of a plurality of bolts (not shown). The transmission extension 14 makes connection through an output drive shaft 18 with the drive shaft of the vehicle.

A large proportion of the repairs which must be made on the transmission involve components situated within the center section transmission case 12. In the present invention, this case may be removed from the vehicle by unfastening a plurality of bolts, one of which is shown at 20. These bolts pass through threaded holes in the transmission case and mate within threaded holes in the transmission housing 10. Seven of these bolts are arranged about the perimeter of the transmission case 12. The line of joinder between the transmission housing and the transmission case is sealed by a gasket 22, which is best illustrated in FIGURE 2. This gasket has a plurality of holes 24 through which the bolts 20 pass. The gasket 22 has a central aperture 26 which was not present on previously existing gaskets. This aperture separates the outer gasket 22 from an inner gasket 28 which lies in the same plane as the gasket 26 but is disconnected therefrom and separates the valve body 30 of the engine from the stator support 32. The transmission input shaft 13 passes through an appropriate aperture in the gasket 28 as do various bolts and alignment pins.

In order to gain access to parts within the transmission case 12 when the transmission is connected to a vehicle, it is only necessary to remove the bolts 20 and disconnect the transmission output shaft 18 from the automotive drive shaft. When replacing the housing 10 and the case 12, only the gasket 22 need be changed, in accordance with the best practice, and if that gasket 22 is in an undamaged condition it may be reused.

Having thus described my invention, I claim:

1. In an automotive transmission having a front housing and a transmission case, having their line of connection lying in a single plane transverse to the axis of the transmission, and having a valve body and stator support which join one another in the same plane, the improvement which consists of a first gasket separating said transmission front housing and transmission case, a second gasket separating said valve body and stator support, a plurality of externally accessible bolts connecting said transmission housing to said transmission case and a plurality of fasteners passing through second gasket and joining said valve body and stator support to one another.

2. In a transmission of the type described, having a front transmission housing which abuts a transmission case in a single plane transverse to the axis of the engine and a valve body which abuts a stator support in the same plane, the improvement consisting of providing separate gaskets between said transmission housing and said transmission case and said valve body and said stator support, said valve body and said stator support being joined by appropriate internal fasteners which pass through their separating gasket and connecting said transmission housing to said transmission case solely by means of bolts accessible from the exterior of the transmission.

References Cited in the file of this patent

Chevrolet Passenger Car Shop Manual, 1958, section 13, page 31.